United States Patent
Uehara et al.

(10) Patent No.: US 9,030,614 B2
(45) Date of Patent: May 12, 2015

(54) LIQUID CRYSTAL OPTICAL ELEMENT AND STEREOSCOPIC IMAGE DISPLAY DEVICE

(75) Inventors: Shinichi Uehara, Tokyo (JP); Masako Kashiwagi, Kanagawa-ken (JP); Ayako Takagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 13/616,280

(22) Filed: Sep. 14, 2012

(65) Prior Publication Data

US 2013/0222716 A1 Aug. 29, 2013

(30) Foreign Application Priority Data

Feb. 29, 2012 (JP) ................. 2012-043649

(51) Int. Cl.
| | |
|---|---|
| G02F 1/1335 | (2006.01) |
| G02B 27/22 | (2006.01) |
| G02F 1/1339 | (2006.01) |
| G02F 1/1343 | (2006.01) |
| G02F 1/29 | (2006.01) |
| H04N 13/04 | (2006.01) |

(52) U.S. Cl.
CPC ............ *G02B 27/22* (2013.01); *G02F 1/1339* (2013.01); *G02F 1/1343* (2013.01); *G02F 1/13394* (2013.01); *G02F 1/29* (2013.01); *H04N 2213/001* (2013.01); *H04N 13/0404* (2013.01); *H04N 13/0454* (2013.01)

(58) Field of Classification Search
CPC ............................ G02B 27/22; G02B 27/2214
USPC .......................................................... 349/15
See application file for complete search history.

(56) References Cited

U.S. PATENT DOCUMENTS

| | | |
|---|---|---|
| 2010/0238276 A1 | 9/2010 | Takagi et al. |
| 2011/0157499 A1* | 6/2011 | Lee et al. .................. 349/15 |
| 2012/0069255 A1 | 3/2012 | Takagi et al. |

FOREIGN PATENT DOCUMENTS

| | | |
|---|---|---|
| JP | 2010-224191 | 10/2010 |
| WO | WO 2011/036736 A1 | 3/2011 |

OTHER PUBLICATIONS

Notification of Reason(s) for Refusal issued by the Japanese Patent Office on Apr. 16, 2014, for Japanese Patent Application No. 2012-043649, and English-language translation thereof.

* cited by examiner

*Primary Examiner* — Thanh-Nhan P Nguyen
(74) *Attorney, Agent, or Firm* — Finnegan, Henderson, Farabow, Garrett & Dunner, L.L.P.

(57) ABSTRACT

According to one embodiment, a liquid crystal optical element includes a first substrate unit, a second substrate unit, a liquid crystal layer, and spacers. The first substrate unit includes a first substrate, first electrodes, and second electrodes. The first substrate has a first major surface. The first electrodes are provided on the first major surface. One of the second electrodes is provided in a space between the first electrodes. The second substrate unit includes a second substrate, and an opposing electrode. The second substrate has a second major surface opposed to the first major surface. The opposing electrode is provided on the second major surface and opposed to the first and second electrodes. The liquid crystal layer is provided between the first and second substrate units. The spacers are in contact with the liquid crystal layer and define a distance between the first and second substrate units.

18 Claims, 4 Drawing Sheets

LIQUID CRYSTAL OPTICAL ELEMENT AND STEREOSCOPIC IMAGE DISPLAY DEVICE

CROSS-REFERENCE TO RELATED APPLICATIONS

This application is based upon and claims the benefit of priority from the prior Japanese Patent Application No. 2012-043649, filed on Feb. 29, 2012; the entire contents of which are incorporated herein by reference.

FIELD

Embodiments described herein relate generally to a liquid crystal optical element and a stereoscopic image display device.

BACKGROUND

There is known a liquid crystal optical element which uses the birefringence of liquid crystal molecules to change the refractive index distribution in response to voltage application. There is also a stereoscopic image display device including such a liquid crystal optical element in combination with an image display unit.

The stereoscopic image display device is switched between two states by changing the refractive index distribution of the liquid crystal optical element. In one state, the image displayed in the image display unit is directly projected on the observer's eye. In the other state, the image displayed in the image display unit is projected as a plurality of parallax images on the observer's eye. This realizes the operation of displaying a high-definition two-dimensional image and the operation of displaying a three-dimensional image for naked-eye stereoscopic viewing by means of a plurality of parallax images. In the liquid crystal optical element used in the stereoscopic image display device, it is desired to realize good optical characteristics.

DETAILED DESCRIPTION

Figure 1A:
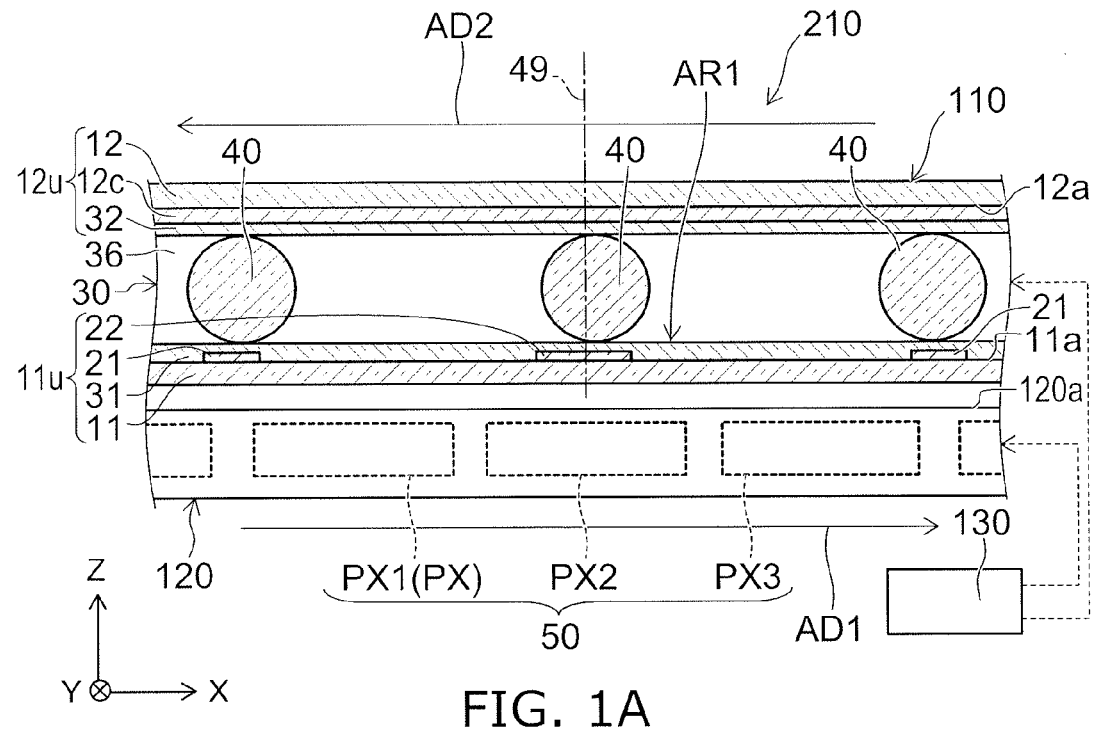
FIG. 1A and FIG. 1B are schematic views illustrating the configuration of a stereoscopic image display device according to a first embodiment.

According to one embodiment, a liquid crystal optical element includes a first substrate unit, a second substrate unit, a liquid crystal layer, and a plurality of spacers. The first substrate unit includes a first substrate, a plurality of first electrodes, and a plurality of second electrodes. The first substrate has a first major surface. The plurality of first electrodes are provided on the first major surface, extend along a first direction, and are arranged in a second direction non-parallel to the first direction. Each first electrode is spaced apart each other. At least one of the second electrodes is provided in space between the first electrodes. The second substrate unit includes a second substrate, and an opposing electrode. The second substrate has a second major surface opposed to the first major surface. The opposing electrode is provided on the second major surface and opposed to the first electrodes and the second electrodes. The liquid crystal layer is provided between the first substrate unit and the second substrate unit. The plurality of spacers are in contact with the liquid crystal layer between the first substrate unit and the second substrate unit and define a distance between the first substrate unit and the second substrate unit. A density of the spacers per unit area in a region overlaying the first electrodes as projected on the first major surface is lower than a density of the spacers per unit area in a region overlaying the second electrodes as projected on the first major surface.

According to one embodiment, a stereoscopic image display device includes a liquid crystal optical element and an image display unit. The liquid crystal optical element includes a first substrate unit, a second substrate unit, a liquid crystal layer, and a plurality of spacers. The first substrate unit includes a first substrate, a plurality of first electrodes, and a plurality of second electrodes. The first substrate has a first major surface. The plurality of first electrodes are provided on the first major surface, extend along a first direction, and arranged in a direction non-parallel to the first direction. Each first electrode is spaced apart each other. At least one of the second electrodes is provided in space between the first electrodes. The second substrate unit includes a second substrate and an opposing electrode. The second substrate has a second major surface opposed to the first major surface. The opposing electrode is provided on the second major surface and opposed to the first electrodes and the second electrodes. The liquid crystal layer is provided between the first substrate unit and the second substrate unit. The plurality of spacers are in contact with the liquid crystal layer between the first substrate unit and the second substrate unit and define a distance between the first substrate unit and the second substrate unit. The image display unit is stacked with the liquid crystal optical element and includes a display surface configured to display an image. A density of the spacers per unit area in a region overlaying the first electrodes as projected on the first major surface is lower than a density of the spacers per unit area in a region overlaying the second electrodes as projected on the first major surface.

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

FIRST EMBODIMENT

Figure 1B:
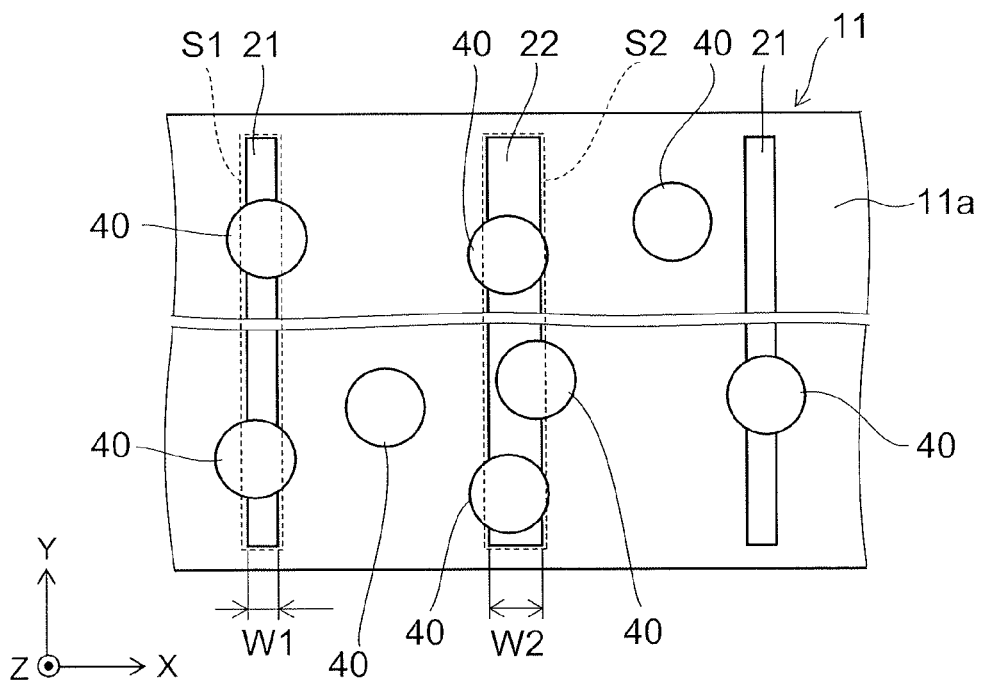

FIG. 1A and FIG. 1B are schematic views illustrating the configuration of a stereoscopic image display device according to a first embodiment.

FIG. 1A is a schematic sectional view illustrating the configuration of the stereoscopic image display device 210. FIG.

1B is a schematic plan view illustrating the configuration of part of the stereoscopic image display device 210.

As shown in FIG. 1A, the stereoscopic image display device 210 includes a liquid crystal optical element 110, an image display unit 120, and a drive unit 130.

The image display unit 120 includes a display surface 120a for displaying an image. The display surface 120a is e.g. rectangular.

The liquid crystal optical element 110 is displaced on the display surface 120a. For instance, the liquid crystal optical element 110 covers the display surface 120a. The liquid crystal optical element 110 functions as e.g. a liquid crystal GRIN lens (gradient index lens). The refractive index distribution of the liquid crystal optical element 110 is variable. One state of the refractive index distribution corresponds to a first state in which the image displayed on the display surface 120a is incident on the eyes of the human viewer. Another state of the refractive index distribution corresponds to a second state in which the image displayed on the image display unit 120 is incident on the eyes of the human viewer as a plurality of parallax images.

By changing the refractive index distribution of the liquid crystal optical element 110, the stereoscopic image display device 210 can be selectively switched between a two-dimensional image display (hereinafter referred to as 2D display) and a three-dimensional image display enabling naked-eye stereoscopic viewing (hereinafter referred to as 3D display).

The drive unit 130 is electrically connected to the liquid crystal optical element 110. In this example, the drive unit 130 is further electrically connected to the image display unit 120. The drive unit 130 controls the operation of the liquid crystal optical element 110 and the image display unit 120. For instance, the drive unit 130 switches between the first state and the second state of the liquid crystal optical element 110. The drive unit 130 receives input of an image signal through e.g. a recording medium or an external input. Based on the inputted image signal, the drive unit 130 controls the operation of the image display unit 120. An image corresponding to the inputted image signal is displayed on the display surface 120a. The drive unit 130 may be included in the image display unit 120. Alternatively, the drive unit 130 may be included in e.g. the liquid crystal optical element 110. For instance, only the part of the drive unit 130 related to driving the liquid crystal optical element 110 may be included in the liquid crystal optical element 110.

In the case of performing 2D display, the drive unit 130 turns the liquid crystal optical element 110 to the first state and causes the image display unit 120 to display an image for 2D display. In the case of performing 3D display, the drive unit 130 turns the liquid crystal optical element 110 to the second state and causes the image display unit 120 to display an image for 3D display.

The liquid crystal optical element 110 includes a first substrate unit 11u, a second substrate unit 12u, a liquid crystal layer 30, and a plurality of spacers 40. The first substrate unit 11u includes a first substrate 11, a plurality of first electrodes 21, and a plurality of second electrodes 22. The second substrate unit 12u includes a second substrate 12 and an opposing electrode 12c.

The first substrate 11 has a first major surface 11a. The second substrate 12 has a second major surface 12a opposed to the first major surface 11a. The first major surface 11a is substantially parallel to the second major surface 12a. The first electrodes 21 are provided in a plurality on the first major surface 11a. The plurality of first electrodes 21 each extend along a first direction and are arranged in a direction non-parallel to the first direction. For instance, the plurality of first electrodes 21 are disposed with spacing in a second direction perpendicular to the first direction. The spacing between the plurality of first electrodes 21 is e.g. constant.

Each of the plurality of second electrodes 22 is provided between adjacent ones of the plurality of first electrodes 21. In this example, the second electrode 22 is provided at a position overlapping with a central axis 49. The central axis 49 passes through a midpoint of a line segment interconnecting centers in the second direction of the two nearest first electrodes 21. The central axis 49 is vertical to the first direction. The position of the center in the second direction of the second electrode 22 is e.g. substantially the same as the position of the central axis 49. The arrangement of the first electrode 21 and the second electrode 22 is e.g. substantially line-symmetric with the central axis 49 serving as the axis of symmetry. The embodiment is not limited thereto, but the arrangement of the second electrode 22 on the first major surface 11a is arbitrary.

A direction perpendicular to the first major surface 11a and the second major surface 12a is taken as a Z-axis direction. One of the directions perpendicular to the Z-axis direction is taken as an X-axis direction. The direction perpendicular to the Z-axis direction and the X-axis direction is taken as a Y-axis direction. In this example, the Y-axis direction is taken as the first direction. The X-axis direction is taken as the second direction. However, in the embodiment, the first direction may be an arbitrary direction perpendicular to the Z-axis direction. The first direction may be an arbitrary direction along the first major surface 11a.

For instance, the relation of the X-axis direction to the two mutually perpendicular sides of the rectangular display surface 120a is arbitrary. In the following, for simplicity of description, it is assumed that one of the two sides is parallel to the X-axis direction, and the other side is parallel to the Y-axis direction.

The second substrate unit 12u is opposed to the first substrate unit 11u. The second major surface 12a of the second substrate 12 is opposed to the first major surface 11a. The opposing electrode 12c is provided on the second major surface 12a. The opposing electrode 12c is opposed to each of the plurality of first electrodes 21 and each of the plurality of second electrodes 22. The opposing electrode 12c covers the first electrodes 21 as viewed in the Z-axis direction. The opposing electrode 12c covers the second electrodes 22 as viewed in the Z-axis direction.

The plurality of first electrodes 21, the plurality of second electrodes 22, and the opposing electrode 12c are electrically connected to the drive unit 130 via interconnects, not shown. Voltage application (potential setting) to the plurality of first electrodes 21, the plurality of second electrodes 22, and the opposing electrode 12c is controlled by the drive unit 130. The switching between the first state and the second state of the liquid crystal optical element 110 is performed by voltage application to the plurality of first electrodes 21, the plurality of second electrodes 22, and the opposing electrode 12c.

The liquid crystal layer 30 is provided between the first substrate unit 11u and the second substrate unit 12u. The liquid crystal layer 30 includes a liquid crystal material 36 including liquid crystal molecules 35. The liquid crystal material 36 is made of e.g. a nematic liquid crystal. The dielectric anisotropy of the liquid crystal material 36 is positive or negative. In the following, it is assumed that the liquid crystal material 36 is made of a nematic liquid crystal having positive dielectric anisotropy.

In this example, the first substrate unit 11u further includes a first alignment film 31. The first alignment film 31 is provided between the first substrate 11 and the liquid crystal layer 30. The first alignment film 31 also is provided between the plurality of first electrodes 21 and the liquid crystal layer 30. The first alignment film 31 also is provided between the plurality of second electrodes 22 and the liquid crystal layer 30. For instance, the first alignment film 31 has been subjected to an alignment processing. The direction of the alignment processing AD1 is e.g. the direction from one side of the X-axis direction toward one other side of the X-axis direction (e.g., the direction from left to right in the state illustrated in FIG. 1A (+X direction)).

The second substrate unit 12u further includes a second alignment film 32. The second alignment film 32 is provided between the second substrate 12 and the liquid crystal layer 30. The second alignment film 32 is provided between the opposing electrode 12c and the liquid crystal layer 30. The second alignment film 32 has been subjected to alignment processing. The direction AD2 of the alignment processing of the second alignment film 32 is e.g. the direction from right to left illustrated in FIG. 1B (−X direction). The direction AD1 of the alignment processing of the first alignment film 31 and the direction AD2 of the alignment processing of the second alignment film 32 are antiparallel. However, the embodiment is not limited thereto. The direction AD1 may be inclined with respect to the X-axis direction, and the direction AD2 may be inclined with respect to the X-axis direction.

For instance, the first alignment film 31 and the second alignment film 32 horizontally align the liquid crystal molecules 35. The first alignment film 31 and the second alignment film 32 direct the director (long axis) of the liquid crystal molecules 35 to the X-axis direction. The liquid crystal molecule 35 may have a prescribed pre-tilt angle. The liquid crystal layer 30 exhibits e.g. a horizontal alignment (that is, parallel alignment) in the state in which a voltage is not applied between the plurality of first electrodes 21 and the opposing electrode 12c (the state shown in FIG. 1A and FIG. 1B).

In the specification, the horizontal alignment includes e.g. the state in which the angle between the plane perpendicular to the Z-axis direction and the long axis of the liquid crystal molecule 35 is in a range of 0° or more and 30° or less. The pre-tilt angle in the horizontal alignment is e.g. 0° or more and 30° or less. Here, the liquid crystal layer 30 may have a hybrid alignment (HAN alignment). In the case where the dielectric anisotropy of the liquid crystal material 36 is negative, the liquid crystal layer 30 has a vertical alignment (the pre-tilt angle is 60° or more and 90° or less) or hybrid alignment (HAN alignment).

The first substrate 11, the second substrate 12, the first electrode 21, the second electrode 22, and the opposing electrode 12c are made of e.g. a transparent material. The light including the image displayed on the image display unit 120 is transmitted through the first substrate 11, the second substrate 12, the first electrode 21, and the second electrode 22.

The first substrate 11 and the second substrate 12 are made of e.g. glass or a resin. The first electrode 21, the second electrode 22, and the opposing electrode 12c include e.g. an oxide including at least one element selected from the group consisting of In, Sn, Zn, and Ti. The first electrode 21, the second electrode 22, and the opposing electrode 12c are made of e.g. ITO. The first electrode 21, the second electrode 22, and the opposing electrode 12c may be made of e.g. at least one of $In_2O_3$ and $SnO_3$. The first electrode 21, the second electrode 22, and the opposing electrode 12c may be e.g. a thin metal layer.

The first alignment film 31 and the second alignment film 32 are made of e.g. a resin such as polyimide. The film thickness of the first alignment film 31 and the second alignment film 32 is e.g. 200 nm (e.g., 100 nm or more and 300 nm or less).

The plurality of spacers 40 are provided between the first substrate unit 11u and the second substrate unit 12u. The plurality of spacers 40 are in contact with the liquid crystal layer 30 between the first substrate unit 11u and the second substrate unit 12u and defines a distance between the first substrate unit 11u and the second substrate unit 12u. The plurality of spacers 40 are e.g. granular. The plurality of spacers 40 are shaped like e.g. a ball, spheroid, or polyhedron. The shape of the plurality of spacers 40 is arbitrary.

The spacer 40 is e.g. light transmissive. The spacer 40 is e.g. transparent. The spacer 40 is made of e.g. an acrylic or styrene-based resin material, or an inorganic material such as silica. A diameter D1 of the spacer 40 is e.g. 30 μm (e.g., 20 μm or more and 50 μm or less). The diameter D1 of the spacer 40 is substantially equal to the distance between the first substrate unit 11u and the second substrate unit 12u.

As shown in FIG. 1B, for instance, a length along the X-axis direction (width in the X-axis direction) W2 of the second electrode 22 is longer than a length W1 along the X-axis direction of the first electrode 21. The length W1 along the X-axis direction of the first electrode 21 is e.g. 5 μm or more and 30 μm or less. The length W2 along the X-axis direction of the second electrode 22 is e.g. 15 μm or more and 100 μm or less.

In the embodiment, as shown in FIG. 1B, a density of the spacers 40 on the first electrode 21 is lower than a density of the spacers 40 on the second electrode 22. The density of the spacers 40 per unit area in the first major surface 11a in a region S1 overlaying the first electrode 21 as projected on the first major surface 11a is lower than the density of the spacers 40 per unit area in the first major surface 11a in a region S2 overlaying the second electrode 22 as projected on the first major surface 11a. For instance, the second electrode 22 traps the spacers 40 to reduce the spacers 40 placed on the first electrode 21. The second electrode 22 functions as a trap electrode for the spacers 40.

The density of the spacers 40 is determined by e.g. determining the number of spacers 40 overlaying the region S1 as projected on the first major surface 11a and converting the number to the number per unit area. Here, the spacer 40 is counted as one in the case of e.g. at least partly overlaying the region S1. Alternatively, the density of the spacers 40 may be represented by e.g. the ratio of the area of the spacers 40 overlaying the region S1 as projected on the first major surface 11a to the area of the region S1. The density of the spacers 40 in the region S2 is defined in the same way as the density of the spacers 40 in the region S1.

The image display unit 120 includes a plurality of pixel groups 50 arranged in a two-dimensional matrix configuration. The display surface 120a is formed from the plurality of pixel groups 50. The length in the Y-axis direction of the first electrode 21 is slightly longer than the length in the Y-axis direction of the display surface 120a. Thus, the first electrode 21 traverses the display surface 120a in the Y-axis direction. The pixel group 50 includes e.g. a first pixel PX1, a second pixel PX2, and a third pixel PX3. In the following, the first pixels PX1 to the third pixels PX3 are also collectively referred to as pixels PX. The pixel group 50 is disposed opposite to a region AR1 between the two nearest first electrodes 21. The first pixels PX1 to the third pixels PX3 included in the pixel group 50 are arranged in e.g. the X-axis direction. The number of the plurality of pixels PX included in the pixel group 50 is not limited to three, but may be two, or four or more.

For instance, the image display unit 120 emits the light including the image to be displayed on the display surface 120a. This light is in a linearly polarized state, traveling substantially in the Z-axis direction. The polarization axis (the orientation axis in the X-Y plane of the vibration plane of the electric field) of this linearly polarized light is e.g. in the X-axis direction. The polarization axis of this linearly polarized light is directed substantially parallel to the director (long axis) of the liquid crystal molecule. This linearly polarized light is formed by e.g. disposing an optical filter (polarizer) having a polarization axis in the X-axis direction on the optical path.

In the case where the voltage is not applied between the plurality of first electrodes 21 and the opposing electrode 12c, each of a plurality of liquid crystal molecules included in the liquid crystal layer 30 is horizontally aligned. Thus, in the X-axis direction and the Y-axis direction, a nearly uniform refractive index distribution is exhibited. Hence, in the case where the voltage is not applied, the traveling direction of the light including the image displayed in the image display unit 120 is left substantially unchanged. In the case where the voltage is not applied, the liquid crystal optical element 110 is switched to the first state.

In the case of switching the liquid crystal optical element 110 from the first state to the second state, the drive unit 130 applies e.g. a first voltage between the plurality of first electrodes 21 and the opposing electrode 12c. The drive unit 130 applies e.g. a second voltage between the plurality of second electrodes 22 and the opposing electrode 12c. Here, for convenience, the case of setting the potential difference between the electrodes to zero is also represented as applying a voltage (a voltage of 0 volts).

The drive unit 130 makes the absolute value (effective value (for example, root-mean-square value)) of the first voltage higher than the absolute value (effective value) of the second voltage. The first voltage is higher than e.g. a threshold voltage for alignment change of the liquid crystal layer 30. In the liquid crystal layer 30, the alignment of the region opposed to the first electrode 21 is changed.

Figure 2A:
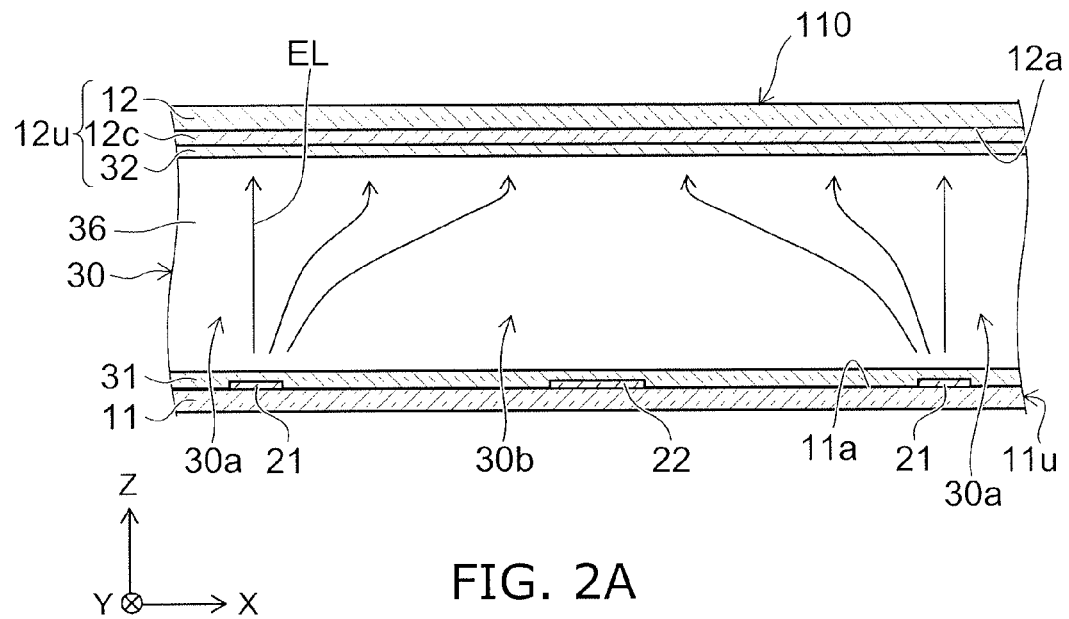
FIG. 2A and FIG. 2B are schematic sectional views illustrating the configuration of the stereoscopic image display device according to the first embodiment.
Figure 2B:
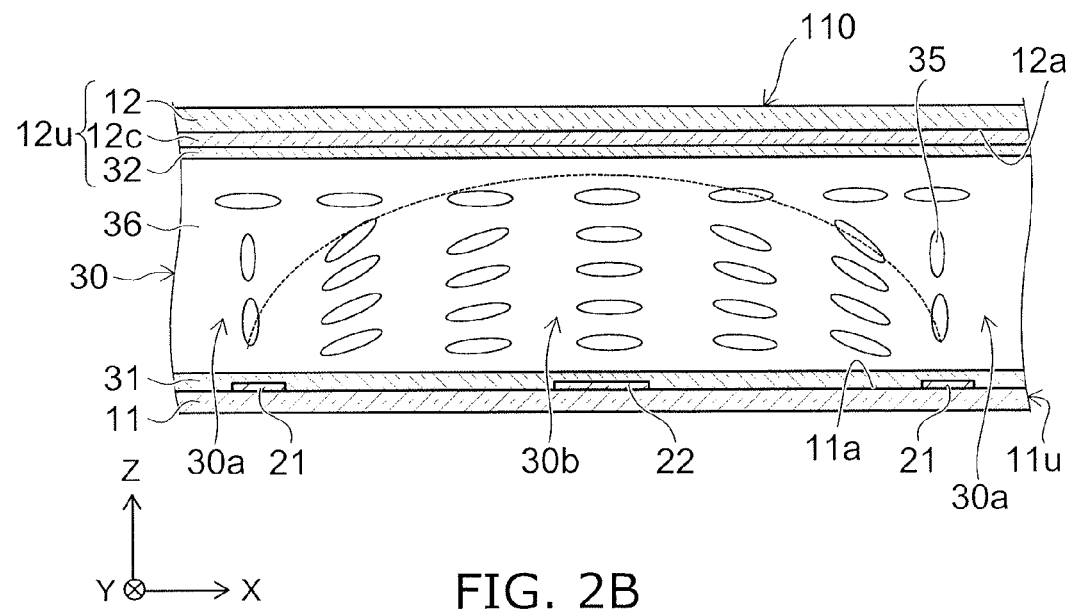

FIG. 2A and FIG. 2B are schematic sectional views illustrating the configuration of part of the stereoscopic image display device according to the first embodiment.

As shown in FIG. 2A, the first voltage is applied between the first electrode 21 and the opposing electrode 12c, and the second voltage is applied between the second electrode 22 and the opposing electrode 12c. Then, lines of electric force EL are produced e.g. from the first electrode 21 toward the opposing electrode 12c. The lines of electric force EL have e.g. a horizontally symmetric distribution with respect to the first electrode 21.

FIG. 2B illustratively models the alignment of the liquid crystal molecules 35 in the liquid crystal layer 30. As shown in FIG. 2B, in the case where the dielectric anisotropy of the liquid crystal layer 30 is positive, for instance, the alignment of the liquid crystal molecules 35 in the dense region of the lines of electric force EL (i.e., high electric field region) is deformed along the line of electric force EL. In a first portion 30a of the liquid crystal layer 30 where the first electrode 21 is opposed to the opposing electrode 12c, the tilt angle of the liquid crystal molecule 35 is increased. In a second portion 30b of the liquid crystal layer 30 where the second electrode 22 is opposed to the opposing electrode 12c, the liquid crystal molecule 35 remains to be horizontally aligned. In the portion between the first portion 30a and the second portion 30b, an intermediate state therebetween is produced. The liquid crystal molecules 35 change the angle of the long axis of the liquid crystal molecule 35 in the Z-X plane along the line of electric force EL.

The liquid crystal molecule 35 is birefringent. The refractive index for polarized light in the long-axis direction of the liquid crystal molecule 35 is higher than the refractive index in the short-axis direction of the liquid crystal molecule 35. By the change of the alignment of the liquid crystal molecules 35, the refractive index of the liquid crystal layer 30 for polarized light (e.g., linearly polarized light having a polarization axis in the X-axis direction) incident on the liquid crystal layer 30 is high in the second portion 30b of the liquid crystal layer 30 and gradually decreases toward the first portion 30a. This forms a refractive index distribution like a convex lens.

The plurality of first electrodes 21 and the plurality of second electrodes 22 extend along the Y-axis direction. Thus, the refractive index distribution of the liquid crystal layer 30 under voltage application is shaped like a cylindrical lens extending along the Y-axis direction. Furthermore, the plurality of first electrodes 21 and the plurality of second electrodes 22 are arranged along the X-axis direction. Thus, in the liquid crystal layer 30 viewed as a whole, the refractive index distribution of the liquid crystal layer 30 under voltage application is shaped like a lenticular lens in which a plurality of cylindrical lenses extending along the Y-axis direction are arranged in the X-axis direction.

The pixel group 50 of the image display unit 120 is placed opposite to the region AR1 between the two adjacent first electrodes 21. The refractive index distribution like a convex lens formed in the liquid crystal layer 30 is opposed to the pixel group 50. In this example, the high refractive index portion (second portion 30b) of the refractive index distribution of the liquid crystal layer 30 is opposed to the second pixel PX2 placed at the center of the pixel group 50.

By the lens characteristics of the refractive index distribution of the liquid crystal layer 30 under voltage application, a plurality of parallax images are selectively projected on the observer's left and right eye to enable 3D display. That is, in the case where a voltage is applied between the plurality of first electrodes 21 and the opposing electrode 12c, the liquid crystal optical element 110 is switched to the second state.

In the case where the liquid crystal optical element 110 is in the first state, the light emitted from the pixel group 50 travels straight and is incident on the eye of the human viewer. This enables 2D display. The 2D display can present 2D display at a higher resolution than 3D display.

The plurality of pixels PX can be provided with a color filter including colors such as RGB or YMC. This enables color display. The color filter can include arbitrary colors.

The liquid crystal optical element 110 of the stereoscopic image display device 210 is switched between 2D display and 3D display by changing the refractive index distribution of the liquid crystal layer 30 depending on the applied voltage.

In the second state of the liquid crystal optical element 110, on the first electrode 21 (or its neighborhood), at least one of reverse tilt (reversal of the tilt direction of the liquid crystal) and twist (rotation in the X-Y plane of the director of the liquid crystal) occurs and causes disclination. This degrades the optical characteristics of the liquid crystal optical element 110.

It is considered that disclination occurs because the electric field produced by the application voltage is directed in a different direction near the electrode. Thus, disclination is likely to occur on the first electrode 21 where the application voltage is high. Disclination is relatively less likely to occur on the second electrode 22 where the application voltage is low. For instance, disclination occurs along the first electrode 21 and tends to expand along the strip-shaped first electrode 21 over time. Disclination often originates from the spacer 40. Around the spacer 40, the region of disclination spreads over time.

In the stereoscopic image display device 210, the occurrence of disclination causes visual confusion (crosstalk) of parallax images and impairs the stereoscopic viewing of the human viewer. The present inventor has found that disclination scarcely occurs on the second electrode 22 where the application voltage is low. Furthermore, the present inventor has found that disclination occurs on the first electrode 21 where the application voltage is high, and causes a practical problem.

In the liquid crystal optical element 110 according to the embodiment, as shown in FIG. 1B, the density of the spacers 40 on the first electrode 21 is lower than the density of the spacers 40 on the second electrode 22. The density of the spacers 40 per unit area in the region S1 (the region overlaying the first electrode 21 as projected on the first major surface 11a) is lower than the density of the spacers 40 per unit area in the region S2 (the region overlaying the second electrode 22 as projected on the first major surface 11a). Thus, the liquid crystal optical element 110 can suppress disclination due to the spacers 40 occurring on the first electrode 21.

In the portion of the central axis 49 where the second electrode 22 is provided, the refractive index distribution formed in the liquid crystal layer 30 changes most gradually. Between the second electrode 22 and the opposing electrode 12c, the potential difference is smaller than between the first electrode 21 and the opposing electrode 12c, and disclination is less likely to occur. Thus, even if the spacers 40 gather in the portion of the second electrode 22, disclination is less likely to occur. Hence, there is less influence on the display.

As described above, the length W2 along the X-axis direction of the second electrode 22 is made longer than the length W1 along the X-axis direction of the first electrode 21. This facilitates making the density of the spacers 40 on the first electrode 21 lower than the density of the spacers 40 on the second electrode 22.

For instance, the plurality of spacers 40 are dispersed by a dry or wet process on the first substrate unit 11u. The dispersed spacers 40 are placed on the first electrodes 21 and the second electrodes 22. The first electrodes 21 and the second electrodes 22 are protrusions in the first substrate unit 11u. Suppose that the width of the first electrode 21 being a protrusion is narrower than the width of the second electrode 22 being a protrusion. Then, the spacers placed on the first electrode 21 roll down more easily from above the first electrode 21 if e.g. vibration is applied to the first substrate unit 11u. In contrast, the spacers 40 placed on the wider second electrode 22 roll down less easily from above the second electrode 22 even under application of e.g. vibration. For instance, after the spacers 40 are dispersed, the first substrate unit 11u is vibrated (moved) along the X-axis direction. This can make the density of the spacers 40 on the first electrode 21 lower than the density of the spacers 40 on the second electrode 22.

When a plurality of electrically charged spacers 40 are dispersed on the first substrate unit 11u, the potential of the first electrode 21 may be set to the same polarity as the charge on the spacers 40. The potential of the second electrode 22 may be set to the opposite polarity to the charge on the spacers 40. Thus, the probability of the spacers 40 being present on the second electrode 22 is made higher than the probability of the spacers 40 being present on the first electrode 21. In this case, the width in the X-axis direction of the second electrode 22 does not need to be wider than the width in the X-axis direction of the first electrode 21.

There is considered a configuration of selectively placing the spacers 40 between the electrodes. In this case, because no conductor is provided between the electrodes, the potential between the electrodes is unstable due to the influence of e.g. static electricity. This makes it difficult to stably and selectively provide the spacers 40 between the electrodes.

In contrast, in the embodiment, the second electrode 22 is a conductor. Hence, the potential of the second electrode 22 is more stable than the potential between the electrodes. The second electrode 22 can also be set to a prescribed potential. The liquid crystal optical element of the embodiment includes at least two kinds of electrodes (first electrode 21 and second electrode 22). Among them, the density of the spacers 40 on the first electrode 21 subjected to a high voltage is made relatively low, and the density of the spacers 40 on the second electrode 22 at a low voltage is made relatively high. Thus, the spacers 40 are selectively placed not between the electrodes but on the second electrode 22. This is effective in decreasing the density of the spacers 40 on the first electrode 21.

Figure 3:
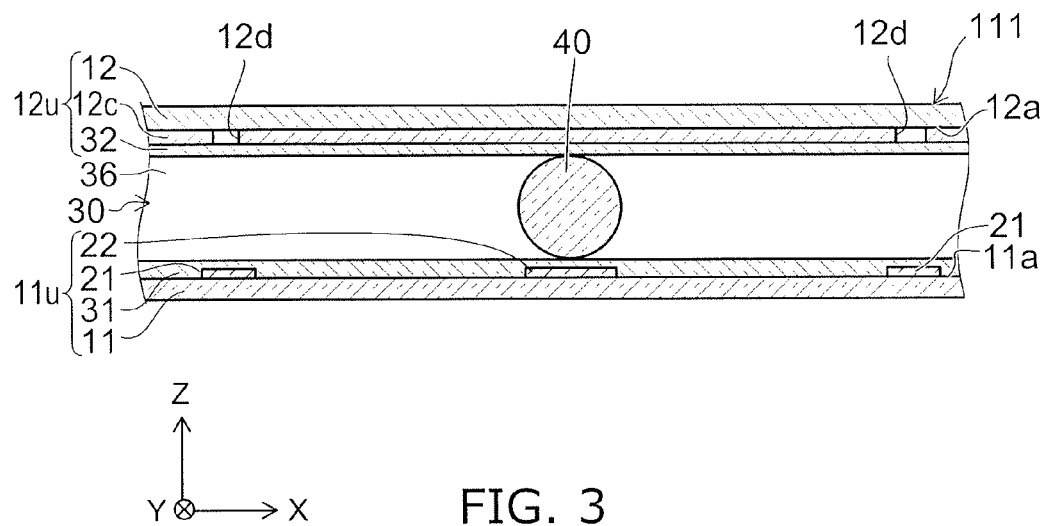
FIG. 3 is a schematic sectional view illustrating a part of another configuration of the stereoscopic image display device according to the first embodiment.

FIG. 3 is a schematic sectional view illustrating part of another configuration of the stereoscopic image display device according to the first embodiment.

As shown in FIG. 3, the opposing electrode 12c of the liquid crystal optical element 111 in this example includes an opening 12d. The opening 12d is provided at a position opposed to each of the plurality of first electrodes 21. A plurality of openings 12d can be provided. The opening 12d extends along e.g. the Y-axis direction.

In this example, for instance, a plurality of electrically charged spacers 40 are dispersed on the second substrate unit 12u. In this case, the electrostatic attractive force acting between the spacer 40 and the portion except the opening 12d in the opposing electrode 12c is made greater than the electrostatic attractive force acting between the spacer 40 and the portion of the opening 12d in the opposing electrode 12c. Thus, the density of the spacers 40 per unit area in the first major surface 11a in the region S1 is made lower than the density of the spacers 40 per unit area in the first major surface 11a in the region S2. Hence, the liquid crystal optical element 111 also achieves good optical characteristics.

In the configuration of the liquid crystal optical element 111, the width in the X-axis direction of the second electrode 22 may or may not be wider than the width in the X-axis direction of the first electrode 21. For instance, in the configuration of the liquid crystal optical element 111, the width in the X-axis direction of the second electrode 22 may be substantially equal to the width in the X-axis direction of the first electrode 21.

SECOND EMBODIMENT

Figure 4:
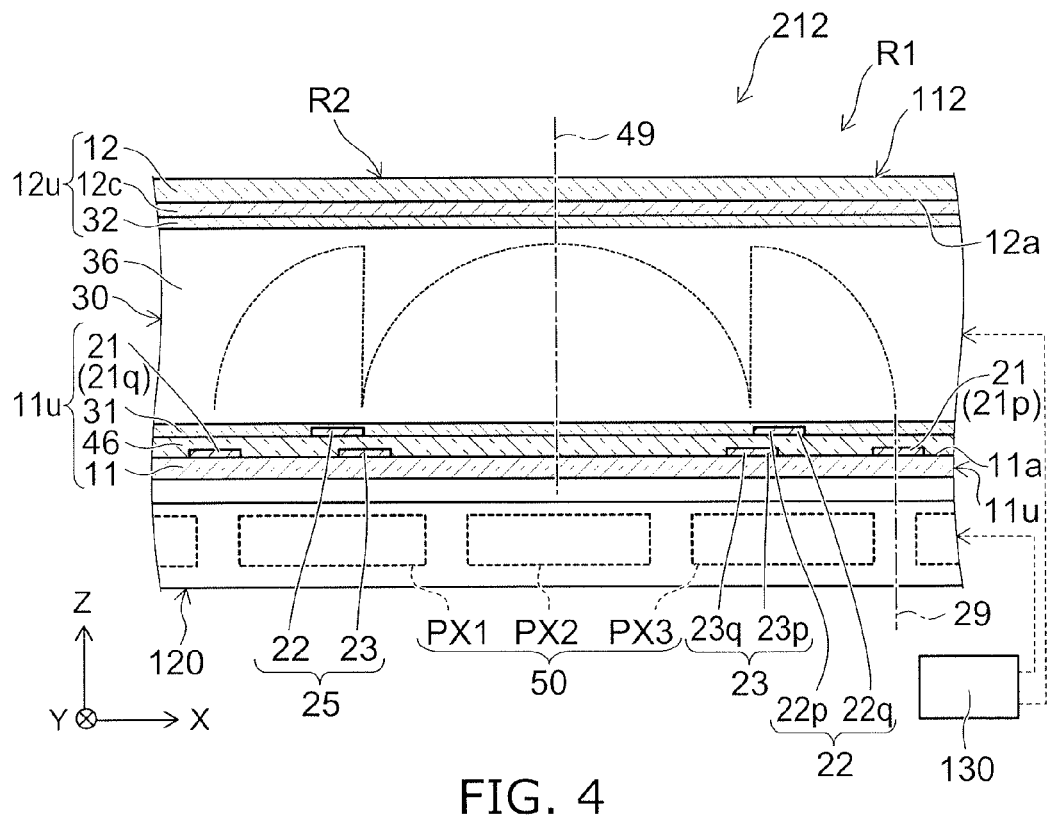
FIG. 4 is a schematic sectional view illustrating the configuration of a stereoscopic image display device according to a second embodiment.

FIG. 4 is a schematic sectional view illustrating the configuration of a stereoscopic image display device according to a second embodiment.

As shown in FIG. 4, in the stereoscopic image display device 212, the first substrate unit 11u of the liquid crystal optical element 112 further includes a plurality of electrode pairs 25. The plurality of electrode pairs 25 are each provided between adjacent ones of the plurality of first electrodes 21 on the first major surface 11a. The plurality of electrode pairs 25 are arranged in the second direction (X-axis direction). In FIG. 4, for clarity of illustration, the spacers 40 are not shown.

Each of the plurality of electrode pairs 25 includes a second electrode 22 and a third electrode 23. The second electrode 22 extends in the Y-axis direction (first direction). The third electrode 23 extends in the Y-axis direction. In the liquid crystal optical element 112, an insulating layer 46 is provided between the second electrode 22 and the third electrode 23. The insulating layer 46 extends along the first major surface 11a. The insulating layer 46 is provided between the first substrate 11 and each of the plurality of second electrodes 22. In this example, each of the plurality of first electrodes 21 is provided between the first substrate 11 and the insulating layer 46. For instance, the insulating layer 46 is provided on the first substrate 11 so as to cover the first electrode 21, the third electrode 23, and the first major surface 11a. The plurality of second electrodes 22 are provided on the insulating layer 46. The insulating layer 46 is continuous among the plurality of electrode pairs 25.

In FIG. 4, two of the plurality of first electrodes 21 are shown. The number of the plurality of first electrodes 21 is arbitrary.

Let us focus on two nearest first electrodes 21 of the plurality of first electrodes 21. A central axis 49 exists between the nearest first electrodes 21. Let us focus on one electrode 21p of the two nearest first electrodes 21. The position 29 of this electrode 21p is the center position in the X-axis direction of the first electrode 21.

On the first major surface 11a, the region between the central axis 49 and the one electrode 21p of the two nearest first electrodes 21 is designated as first region R1. On the first major surface 11a, the region between the central axis 49 and the other electrode 21q of the two nearest first electrodes 21 is designated as second region R2. The direction from the central axis 49 toward the electrode 21p is designated as +X direction. Then, the direction from the central axis 49 toward the electrode 21q corresponds to −X direction.

In this example, in the first region R1, one electrode pair 25 is provided. Also in the second region R2, one electrode pair 25 is provided. As projected on the X-Y plane, the plurality of electrode pairs 25 are spaced from each other. A region without electrodes is present between the electrode pairs 25. In the embodiment, another electrode may be further provided between the electrode pairs 25.

In one electrode pair 25, the second electrode 22 includes a first superimposed portion 22p overlaying the third electrode 23 as projected on the plane parallel to the first direction and the second direction (X-Y plane), and a first non-superimposed portion 22q not overlaying the third electrode 23. In the one electrode pair 25, the third electrode 23 includes a second superimposed portion 23p overlaying the second electrode 22 as projected on the X-Y plane, and a second non-superimposed portion 23q not overlaying the second electrode 22.

In the liquid crystal optical element 112, in the electrode pair 25 included in the first region R1, the first superimposed portion 22p is placed between the second superimposed portion 23p and the liquid crystal layer 30. The position of the second electrode 22 is shifted in the X-axis direction relative to the position of the third electrode 23. Specifically, in one electrode pair 25, the distance between the second non-superimposed portion 23q and the central axis 49 is shorter than the distance between the first non-superimposed portion 22q and the central axis 49. That is, in one electrode pair 25, the second electrode 22 is farther from the central axis 49 than the third electrode 23. The distance in the X-axis direction between one of the second electrodes 22 and the central axis 49 is longer than the distance in the X-axis direction between one of the third electrodes 23 and the central axis 49.

The arrangement of the electrode pair 25 in the second region R2 is substantially line-symmetric with the central axis 49 serving as the axis of symmetry. However, it does not need to be exact line symmetry. For instance, slight asymmetry may be introduced based on the distribution of the arrangement (e.g., pre-tilt angle) in the liquid crystal layer 30.

In the case of switching the liquid crystal optical element 112 from the first state to the second state, for instance, the drive unit 130 applies a first voltage between the first electrode 21 and the opposing electrode 12c, applies a second voltage between the second electrode 22 and the opposing electrode 12c, and applies a third voltage between the third electrode 23 and the opposing electrode 12c. Here, for convenience, the case of zeroing the potential difference between the electrodes is also represented as applying a voltage (a voltage of 0 volts).

The absolute value of the first voltage is larger than the absolute value of the second voltage. The absolute value of the first voltage is larger than the absolute value of the third voltage. The absolute value of the second voltage is smaller than the absolute value of the third voltage. In the case where these voltages are alternating, the effective value of the first voltage is larger than the absolute value of the second voltage. The effective value of the first voltage is larger than the absolute value of the third voltage. The effective value of the second voltage is smaller than the absolute value of the third voltage. For instance, the effective value of the first voltage is set larger than the effective value of the third voltage.

If the voltages are applied as described above, then in the portion of the liquid crystal layer 30 where the first electrode 21 is opposed to the opposing electrode 12c, the liquid crystal molecule 35 that has been horizontally aligned is made close to vertically aligned. In the portion of the liquid crystal layer 30 around the midpoint of two adjacent (e.g., nearest) first electrodes 21, the liquid crystal molecule 35 remains to be horizontally aligned. In the portion of the liquid crystal layer 30 where the opposing electrode 12c is opposed to the second electrode 22, the liquid crystal molecule 35 remains to be horizontally aligned. In the portion of the liquid crystal layer 30 where the opposing electrode 12c is opposed to the second non-superimposed portion 23q of the third electrode 23, the liquid crystal molecule 35 that has been horizontally aligned is made close to vertically aligned.

In the portion between the first electrode 21 and the second electrode 22, the refractive index gradually increases from the first electrode 21 toward the second electrode 22. Around the boundary between the first superimposed portion 22p and the second non-superimposed portion 23q, the refractive index sharply decreases from the second electrode 22 toward the third electrode 23. In the portion between the third electrode 23 and the central axis 49, the refractive index gradually increases from the third electrode 23 toward the central axis 49. Hence, if the voltages are applied as described above, the refractive index distribution like a Fresnel lens appears in the liquid crystal layer 30. The refractive index distribution has a step difference of refractive index in the portion where the opposing electrode 12c is opposed to the electrode pair 25.

In the liquid crystal optical element 112 forming a refractive index distribution like a Fresnel lens in the liquid crystal layer 30, the thickness of the liquid crystal layer 30 can be made thinner than in the liquid crystal optical element 110. The response rate of the liquid crystal layer 30 in switching between the first state and the second state can be increased.

In the liquid crystal optical element 112, for instance, a plurality of electrically charged spacers 40 are dispersed on the first substrate unit 11u. For instance, the electrostatic attractive force acting between the second electrode 22 and the spacer 40 without the intermediary of the insulating layer 46 is made greater than the electrostatic attractive force acting between the first electrode 21 and the spacer 40 via the insulating layer 46. Thus, the density of the spacers 40 per unit area in the first major surface 11a in the region S1 is made lower than the density of the spacers 40 per unit area in the first major surface 11a in the region S2. Hence, the liquid crystal optical element 112 also achieves good optical characteristics.

The third electrode 23 may be part of the first electrode 21. That is, at least one of the first electrodes 21 includes a first superimposed portion overlaying the second electrode 22 as projected on the plane parallel to the first direction and the second direction, and a first non-superimposed portion not overlaying the second electrode 22. The second electrode 22 includes a second superimposed portion overlaying the first electrode 21 as projected on the plane, and a second non-superimposed portion not overlaying the first electrode 21.

Figure 5:
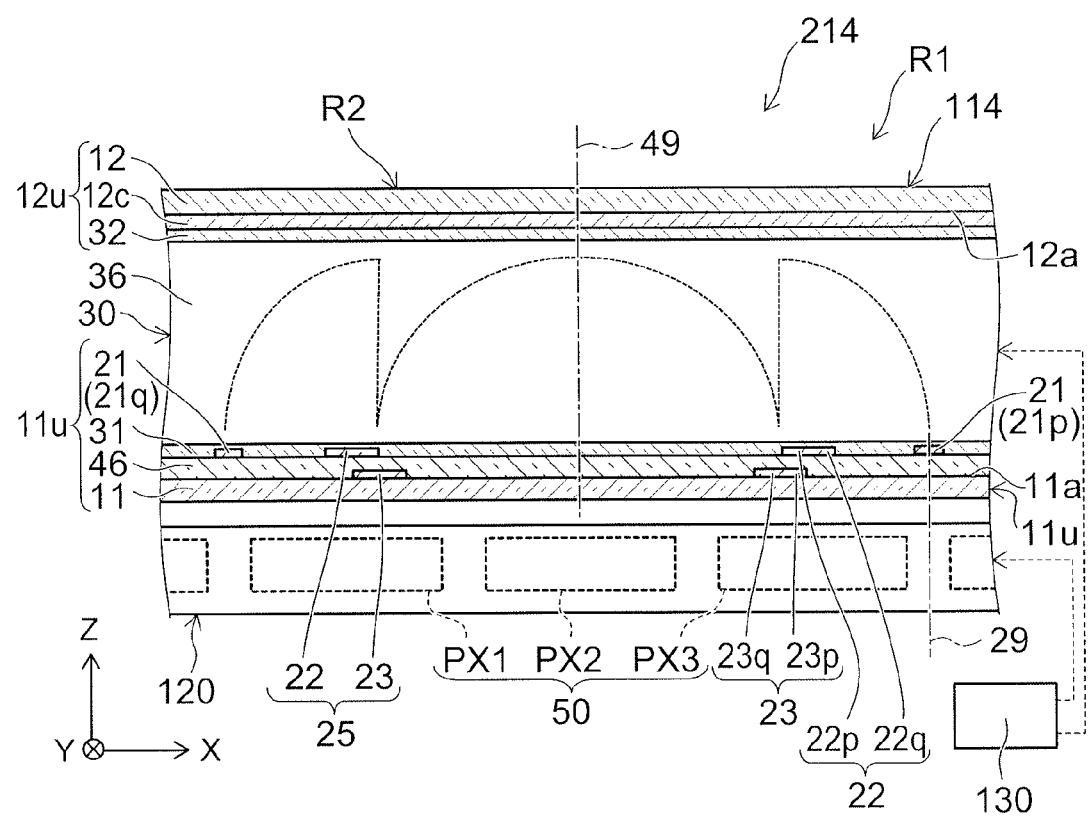
FIG. 5 is a schematic sectional view illustrating another configuration of the stereoscopic image display device according to the second embodiment.

FIG. 5 is a schematic sectional view illustrating another configuration of the stereoscopic image display device according to the second embodiment.

As shown in FIG. 5, in the liquid crystal optical element 114 of the stereoscopic image display device 214, the first electrode 21 is provided on the insulating layer 46. In this example, the width in the X-axis direction of the first electrode 21 is narrower than the width in the X-axis direction of the second electrode 22. The width in the X-axis direction of the first electrode 21 is narrower than the width in the X-axis direction of the third electrode 23. The configuration of the liquid crystal optical element 114 is a combination of the configuration of the liquid crystal optical element 110 and the configuration of the liquid crystal optical element 112. Hence, the liquid crystal optical element 114 also achieves good optical characteristics.

In the liquid crystal optical element 112, the potential difference set between the first electrode 21 and the opposing electrode 12c is hampered by the insulating layer 46. In the liquid crystal optical element 114, no insulating layer 46 is present between the first electrode 21 and the opposing electrode 12c. Thus, in the liquid crystal optical element 114, the potential difference between the first electrode 21 and the opposing electrode 12c can be set efficiently.

As illustrated in the liquid crystal optical element 114, the configuration of the liquid crystal optical element 110 and the configuration of the liquid crystal optical element 112 can be combined arbitrarily. For instance, in the configuration of the liquid crystal optical element 110, the first substrate unit 11u may include an insulating layer 46.

According to the embodiments, a liquid crystal optical element and a stereoscopic image display device having good optical characteristics are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

The embodiments of the invention have been described above with reference to examples. However, the embodiments of the invention are not limited to these examples. For instance, any specific configurations of various components such as the first substrate unit, second substrate unit, liquid crystal layer, spacer, first substrate, first electrode, second electrode, second substrate, opposing electrode, insulating layer, opening, and image display unit included in the liquid crystal optical element and the stereoscopic image display device are encompassed within the scope of the invention as long as those skilled in the art can similarly practice the invention and achieve similar effects by suitably selecting such configurations from conventionally known ones.

Further, any two or more components of the specific examples may be combined within the extent of technical feasibility and are included in the scope of the invention to the extent that the purport of the invention is included.

In addition, those skilled in the art can suitably modify and implement the liquid crystal optical element and the stereoscopic image display device described above in the embodiments of the invention. All the liquid crystal optical elements and the stereoscopic image display devices thus modified are also encompassed within the scope of the invention as long as they fall within the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical element comprising:
   a first substrate unit including:
      a first substrate having a first major surface;
      a plurality of first electrodes provided on the first major surface, extending along a first direction, and arranged in a second direction non-parallel to the first direction, each first electrode spaced apart each other; and
      a plurality of second electrodes, at least one of the second electrodes being provided in space between the first electrodes;
   a second substrate unit including:
      a second substrate having a second major surface opposed to the first major surface; and
      an opposing electrode provided on the second major surface and opposed to the first electrodes and the second electrodes, the opposing electrode including an opening provided at a position opposed to the first electrodes;
   a liquid crystal layer provided between the first substrate unit and the second substrate unit; and
   a plurality of spacers being in contact with the liquid crystal layer between the first substrate unit and the second substrate unit and defining a distance between the first substrate unit and the second substrate unit,
   a density of the spacers per unit area in a region overlaying the first electrodes as projected on the first major surface being lower than a density of the spacers per unit area in a region overlaying the second electrodes as projected on the first major surface.

2. The element according to claim 1, wherein a length along a second direction perpendicular to the first direction of the second electrodes is longer than a length along the second direction of the first electrodes.

3. The element according to claim 2, wherein
   the first substrate unit further includes an insulating layer provided between the first substrate and the second electrodes, and
   the first electrodes are provided on the insulating layer.

4. The element according to claim 2, wherein
the length along the second direction of the first electrodes is 5 μm or more and 30 μm or less, and
the length along the second direction of the second electrodes is 15 μm or more and 100 μm or less.

5. The element according to claim 1, further comprising:
a drive unit that applies a voltage to the first electrodes, the second electrodes, and the opposing electrode,
an absolute value of the voltage applied between the first electrodes and the opposing electrode being larger than an absolute value of the voltage applied between the second electrodes and the opposing electrode.

6. The element according to claim 1, wherein
the first substrate unit further includes an insulating layer provided between the first substrate and the second electrodes, and
the first electrodes are provided between the first substrate and the insulating layer.

7. The element according to claim 6, wherein
the first substrate unit further includes a plurality of third electrodes extending in the first direction and provided between the first substrate and the insulating layer,
one of the second electrodes includes:
a first superimposed portion overlaying one of the third electrodes as projected on a plane parallel to the first direction and the second direction perpendicular to the first direction; and
a first non-superimposed portion not overlaying the one of the third electrodes as projected on the plane, and
the one of the third electrodes includes:
a second superimposed portion overlaying the one of the second electrodes as projected on the plane; and
a second non-superimposed portion not overlaying the one of the second electrodes as projected on the plane.

8. The element according to claim 7, wherein
the one of the second electrodes is provided in a first region between a central axis passing through a midpoint of a line segment interconnecting centers in the second direction of two nearest ones of the first electrodes and being vertical to the first direction and one of the two nearest first electrodes, and another of the second electrodes is provided in a second region between the central axis and one other of the two nearest first electrodes,
the one of the third electrodes is provided in the first region, and another of the third electrodes is provided in the second region, and
a distance in the second direction between the one of the second electrodes and the central axis is longer than a distance in the second direction between the one of the third electrodes and the central axis.

9. The element according to claim 1, wherein the second electrodes are provided at a position overlapping with a central axis passing through a midpoint of a line segment interconnecting centers in the second direction perpendicular to the first direction of two nearest ones of the first electrodes and being vertical to the first direction.

10. The element according to claim 1, wherein the liquid crystal layer has positive dielectric anisotropy.

11. The element according to claim 10, wherein the liquid crystal layer is horizontally aligned in a state in which a voltage is not applied between the first electrodes and the opposing electrode.

12. The element according to claim 1, wherein the spacers have a diameter of 20 μm or more and 50 μm or less.

13. The element according to claim 1, wherein
the opposing electrode includes a plurality of openings extending in the first direction, and
the openings are provided at a position opposed to the first electrodes.

14. The element according to claim 13, wherein a length along the second direction perpendicular to the first direction of the second electrodes is equal to a length along the second direction of the first electrodes.

15. A stereoscopic image display device comprising:
a liquid crystal optical element including:
a first substrate unit including:
a first substrate having a first major surface;
a plurality of first electrodes provided on the first major surface, extending along a first direction, and arranged in a direction non-parallel to the first direction, each first electrode spaced apart each other; and
a plurality of second electrodes, at least one of the second electrodes being provided in space between the first electrodes;
a second substrate unit including:
a second substrate having a second major surface opposed to the first major surface; and
an opposing electrode provided on the second major surface and opposed to the first electrodes and the second electrodes, the opposing electrode including an opening provided at a position opposed to the first electrodes;
a liquid crystal layer provided between the first substrate unit and the second substrate unit; and
a plurality of spacers being in contact with the liquid crystal layer between the first substrate unit and the second substrate unit and defining a distance between the first substrate unit and the second substrate unit; and
an image display unit stacked with the liquid crystal optical element and including a display surface configured to display an image,
a density of the spacers per unit area in a region overlaying the first electrodes as projected on the first major surface being lower than a density of the spacers per unit area in a region overlaying the second electrodes as projected on the first major surface.

16. The device according to claim 15, wherein a light is emitted from the display surface, the light is incident on the liquid crystal optical element, and the light includes an image to be displayed and includes a linearly polarized state having a polarization axis in a second direction perpendicular to the first direction.

17. The device according to claim 15, further comprising:
a drive unit that applies a first voltage between the first electrodes and the opposing electrode, and to apply a second voltage between the second electrodes and the opposing electrode,
an effective value of the first voltage being larger than an effective value of the second voltage, and
alignment of liquid crystal of the liquid crystal layer being changed by the first voltage.

18. The device according to claim 15, further comprising:
a drive unit that applies a voltage to the first electrodes, the second electrodes and the opposing electrode,
the first substrate unit further including:
an insulating layer provided between the first substrate and the second electrodes; and
a plurality of third electrodes extending in the first direction and provided between the first substrate and the insulating layer, one of the second electrodes including:
- a first superimposed portion overlaying one of the third electrodes as projected on a plane parallel to the first direction and a second direction perpendicular to the first direction; and
- a first non-superimposed portion not overlaying the one of the third electrodes as projected on the plane, the one of the third electrodes including:
- a second superimposed portion overlaying the one of the second electrodes as projected on the plane; and
- a second non-superimposed portion not overlaying the one of the second electrodes as projected on the plane, the drive unit applying a first voltage between the first electrodes and the opposing electrode, to apply a second voltage between the second electrodes and the opposing electrode, and to apply a third voltage between the third electrodes and the opposing electrode, an effective value of the first voltage being larger than an effective value of the second voltage, the effective value of the first voltage being larger than an effective value of the third voltage, and the effective value of the second voltage being smaller than the effective value of the third voltage.

* * * * *